United States Patent [19]
Krause et al.

[11] Patent Number: 5,820,966
[45] Date of Patent: Oct. 13, 1998

[54] REMOVAL OF ARSENIC FROM IRON ARSENIC AND SULFUR DIOXIDE CONTAINING SOLUTIONS

[75] Inventors: Eberhard Krause, Oakville; Yoshiaki Okita, St. Catherines; Reichel Abelis Tenbergen, Hanmer; Brian Charles Blakely; Justin Raskauskas, both of Mississauga, all of Canada

[73] Assignee: Inco Limited, Toronto, Canada

[21] Appl. No.: 987,513

[22] Filed: Dec. 9, 1997

[51] Int. Cl.$^6$ ................................................. C22B 30/00
[52] U.S. Cl. .................................................... 423/87
[58] Field of Search .......................... 423/87; 210/712, 210/713, 714

[56] References Cited

U.S. PATENT DOCUMENTS

| | | | |
|---|---|---|---|
| 3,617,562 | 11/1971 | Cywin | 210/48 |
| 3,738,932 | 6/1973 | Kostenbader | 210/46 |
| 4,241,039 | 12/1980 | Koh et al. | 423/87 |
| 4,366,128 | 12/1982 | Weir et al. | 423/87 |
| 4,655,829 | 4/1987 | Cashman | 75/101 R |
| 5,024,769 | 6/1991 | Gallup | 210/721 |
| 5,427,691 | 6/1995 | Kuyucak et al. | 210/713 |
| 5,482,534 | 1/1996 | Leonard et al. | 423/87 |

FOREIGN PATENT DOCUMENTS

| | | | |
|---|---|---|---|
| 1183974 | 3/1985 | Canada. | |
| 59-164639 | 9/1984 | Japan | 423/87 |

OTHER PUBLICATIONS

W.J. Kuit, "Mine and Trailings Effluent Treatment at the Kimberley, B.C. operations of Cominco Ltd." CTM Bulletin, Dec. 1980 pp. 105–112.

P.W.M. Shibley, "Flocculated Precipitants Reaction Technique Yields Coarse Precipitates," Second International Conference on the Abatement of Acidic Mine Drainage, 1991 pp. 259–270, Sep.

Harris and Krause, "The Disposal of Arsenic from Metallurgical Processes: ITS Status Regarding Ferric Arsenate," The Paul E. Queneau International Symposium, Extractive Metallurgy of Copper, Nickel and Cobalt, Vol. I, 1993, pp. 1221–1237, no month.

"Acid Mine Drainage–Status of Chemical Treatment and Sludge Management Practices," CANMET, 1994, Jun., no author.

Kuyucak et al., "Improved Lime Neutralization Process," Presented at Sudbury '95, Conference on Mining and the Environment, Sudbury, Ontario, 1995, no month.

*Primary Examiner*—Steven Bos
*Attorney, Agent, or Firm*—Blake T. Biederman; Edward A. Steen

[57] ABSTRACT

The process provides a method of removing arsenic from solutions containing sulfur dioxide in an environmentally acceptable manner. This process first oxidizes arsenic, iron and sulfur dioxide contained in an aqueous solution to prepare the solution for precipitation and to improve process control. Recycled neutralized precipitate seeds the oxidized aqueous solution. A calcium-containing base precipitates products of neutralization on the seeds. The final neutralized precipitate contains a stable ferric arsenate compounds.

11 Claims, 3 Drawing Sheets

REMOVAL OF ARSENIC FROM IRON ARSENIC AND SULFUR DIOXIDE CONTAINING SOLUTIONS

FIELD OF INVENTION

This invention relates to a method of disposing arsenic from acidic solutions. In particular, this invention relates to an environmentally acceptable method of disposing of arsenic from sulfur dioxide-containing solutions.

BACKGROUND OF THE INVENTION

Today's gas cleaning processes capture the bulk of sulfur dioxide and flue dust produced by smelting sulfides ores. Gas cleaning by aqueous scrubbing typically produces acidic solutions rich in sulfur dioxide gas, dissolved metals at low valency states, e.g. iron in its ferrous state and arsenic in its arsenous state and particulate matter. Unfortunately, neutralizing these solutions with calcium-based neutralizers often precipitates a gypsum scale that quickly clogs up equipment. In addition, the precipitates containing the low oxidation state constituents, may leach out under the conditions of some tailings disposal areas.

Magnesium hydroxide solves the scaling problem associated with calcium-based neutralizers. The problems with magnesium hydroxide however, include slow reaction rates at high pH values that result in incomplete neutralization and higher relative costs. In view of these factors, magnesium hydroxide does not present a favorable solution for neutralizing acidic streams that arise from wet gas cleaning of a smelter's flue gas.

P. D. Kostenbader, in U.S. Pat. No. 3,738,932, discloses a method of treating acid mine drainage or diluted waste pickling liquor with high-calcium lime. In this process, the lime is pre-mixed with recycled sludge before it neutralizes the acid stream. The pre-mixed lime neutralizes in a reactor mixed with air. This air oxidizes metal values to facilitate settling of the sludge. Although effective for mine drainage and pickling liquors, this process does not provide an effective process for disposing of arsenic contained in sulfur dioxide-bearing solutions.

Herman et al, in Canadian Pat. No. 1,183,974, disclose a process for removing heavy metals from wastewater. In this process, the neutralizing agent is pre-mixed with recycled sludge; and it neutralizes the suspension in two reactors. The process discloses that arsenic can be precipitated in the presence of soluble iron or lead. This process, however, does not disclose any method for precipitating arsenic in an environmentally stable manner from sulfur-dioxide bearing solutions.

It is an object of the invention to provide a low scaling rate method of neutralizing solutions from wet gas cleaning of smelter flue gases using calciumcontaining bases with an acceptable scaling rate.

It is a further object of this invention to provide a method of removing arsenic from sulfur dioxide-containing solutions.

It is a further object of this invention to provide a method of disposing of arsenic in an environmentally stable manner.

SUMMARY OF THE INVENTION

The process provides a method of removing arsenic from solutions containing sulfur dioxide in an environmentally acceptable manner. This process first oxidizes arsenic, iron and sulfur dioxide contained in an aqueous solution to prepare the solution for precipitation and to improve process control. Recycled neutralized precipitate seeds the oxidized aqueous solution. A calcium-containing base precipitates products of neutralization on the seeds. The final neutralized precipitate contains stable ferric arsenate compounds.

DESCRIPTION OF PREFERRED EMBODIMENTS

The invention provides a method for neutralizing acid streams resulting from the treatment of smelter flue gases and particulates. This process relies upon the initial oxidation of arsenic, iron and sulfur dioxide to facilitate complete neutralization of the solution. Furthermore, recycling a portion of the neutralized sludge into a conditioning tank prepares the oxidized stream for neutralizing by saturating the solution with gypsum, which also provides a sufficient amount of gypsum seeds. A calcium-containing base then neutralizes the conditioned acid stream in a separate neutralization tank. The products of neutralization precipitate predominantly on the recycled sludge seeds or in solution, not on the tank walls.

Figure 1:
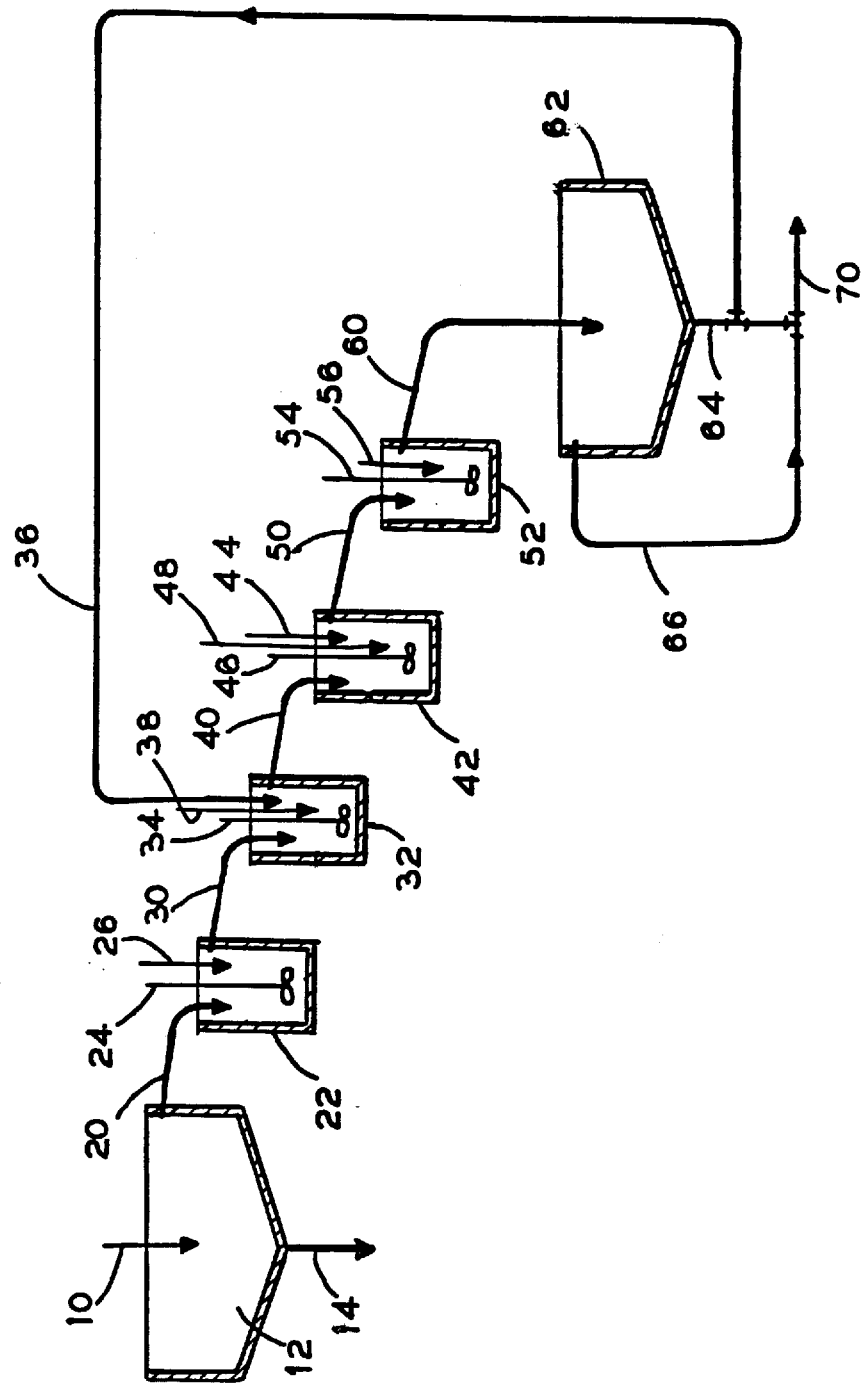
FIG. 1 is a schematic flow sheet of the acid stream neutralizing process.

Referring to FIG. 1, first the acidic smelter wet gas cleaning stream 10 flows into a thickener 12. The thickener underflow 14 is filtered and the solids are returned back to the smelter. The overflow stream 20, rich in arsenic, iron and sulfur dioxide, flows to an oxidation tank 22. Mixer 24 stirs the air 26 in the oxidation tank 22 to achieve uniform and complete oxidation of the arsenic, iron and sulfur dioxide before neutralization. Oxidized product 30 flows into the conditioning tank 32. In the conditioning tank 32, mixer 34 stirs recycled neutralized product 36 with oxidized product 30 to prepare the solution for neutralizing and to provide seeds for the neutralizing step. Pumping air 38 into conditioning tank 32 further completes oxidation of the conditioned stream.

Seeded and partially neutralized solution 40 flows into a first neutralization tank 42, where a calcium-containing base 44 is added. The base is quickly dispersed in the tank 42 by the mixer 46 in the presence of air 48. The dispersed base reacts with the oxidized and seeded solution to precipitate neutralized product provided in the conditioning tank 32. A neutralized stream 50 flows into a second neutralization tank 52. Mixer 54 provides the agitation in this tank to complete neutralization of the acid stream. Pumping air 56 into the tank 52 ensures complete oxidation of the precipitate.

Finally, neutralized slurry 60 flows to thickener 62. A portion of the thickener underflow 64 and overflow 66 recombine as disposal stream 70 that flows to a tailings area for disposal. A portion of the neutralized thickener underflow 36 recycles to the conditioning tank 32 to reseed the process.

Optionally, it is possible to adapt this process to recover valuable metals present in the feed stream without significant modification to the circuit. For example, nickel may be removed from stream 40 by first neutralizing to a pH below about 6 in reactor 42 to primarily precipitate non-nickel ions. After this initial precipitation, the solid material in underflow slurry stream 70 is removed and the pH of the resulting liquor is further increased by base addition to precipitate nickel. The precipitated nickel solids may then be recovered from the neutralized slurry. The neutralized liquor can then be mixed with the rejected solids from stream 70 and the pH of this slurry stream can be further raised to a pH of about 9 to 9.5, if required.

Specifically, the primary reactions in the oxidation tank are as follows:

$$2FeSO_4 + 2SO_2 + O_2 \rightarrow Fe_2(SO_4)_3 \quad (1)$$

$$2SO_2 + 2H_2O + O_2 \rightarrow 2H_2SO_4 \quad (2)$$

Air is the most economically advantageous oxidizing agent for this step. Other oxidizing agents such as ozone and commercially pure oxygen may also serve to oxidize the feed source. This oxidizing step also serves to oxidize arsenic contained in the solution. Advantageously, this oxidation step occurs in a separate tank, since simultaneous oxidation and neutralization of sulfur dioxide-containing solution with the calcium-containing base may precipitate calcium sulfite. Oxidizing the streams before neutralization appears to eliminate these adverse side reactions.

The oxidation of $Fe^{+2}$ in the acidic solution is normally slow with the air alone. The presence of sulfur dioxide however, accelerates the iron oxidation (see reaction 1). For this reason, most advantageously, a single vessel is used to oxidize the feed solution. Thus, during continuous operations of the process, the single tank receives a constant flow of $SO_2$ from the feed solution that promotes the oxidation of iron. In the presence of sufficient $SO_2$, the process achieved an oxidation rate of 2(kg $O_2/m^3$)/h at 75° C. with aeration (air) of 0.2–0.4 (L/min. per liter of tank volume) and a tank residence time of 45 to 60 minutes.

The process operates best with a separate seed conditioning tank. Mixing recycled precipitate into the acidic oxidized solution in the conditioning tank prepares the solution for calcium-based neutralizing agents by saturating it with gypsum and cleaning the surface of gypsum seeds. Neutralizing the conditioned solution significantly decreases the scale growth rate on tank walls.

In the neutralization tank, calcium-based neutralizing agents neutralize the oxidized stream to a final pH of at least about 7. Most advantageously, the process neutralizes to a pH of at least about 9 to promote removal of divalent non-ferrous metals, such as, nickel, cobalt and zinc. Common sources of calcium-containing bases include limestone, lime kiln dust, dolime, lime, slaked lime and slaked dolime. When using slaked lime for neutralization, the following reactions occur:

Neutralization $$H_2SO_4 + Ca(OH)_2 \rightarrow CaSO_4 \bullet 2H_2O \quad (3)$$

$$Fe_2(SO_4)_3 + 3Ca(OH)_2 + 6H_2O \rightarrow 2Fe(OH)_3 + 3CaSO_4 \bullet 2H_2O \quad (4)$$

If the acidic solution received independent seeding and conditioning, a minimum amount of gypsum scale formed. Maintaining an iron to arsenic molar ratio of at least about 2 facilitates forming an environmentally stable ferric arsenate precipitate. Most advantageously, the process maintains an iron to arsenic molar ratio of at least about 4.

Example

The flow sheet of FIG. 1 in combination with the equipment of Table 1 provided the neutralizing process.

TABLE 1

| | |
|---|---|
| Smelter bleeds liquor feed flow rate, mL/min | 300 |
| Number of oxidation tanks | 1 |
| Total oxidation residence time, min* | 60 |
| Number of seed conditioning tanks | 1 |
| Total conditioning residence time, min* | 60 |
| Number of neutralization tanks | 2 |
| Total neutralization residence time, min* | 120 |
| Oxidation/neutralization tank temperature, °C. | 75 |
| Oxidation/neutralization tank aeration rate, L/min per L tank vol. | 0.4 |
| Target circulating load, % solids | >100 |

*The total superficial residence times equals is the total volumetric capacity of the reaction tank or series of tanks, divided by the feed volumetric flow-rate. The total slurry volume during normal operation is 15 L.

The aqueous feed contained the concentrations that varied according to the range of values of Table 2 below.

TABLE 2

| VARIATION IN FEED LIQUOR COMPOSITION | | |
|---|---|---|
| | LOW | HIGH |
| pH | 4.1 | 1.3 |
| S (g/L) | 7.64 | 10.3 |
| Fe (g/L) | 1.56 | 7.53 |
| Ni (g/L) | 0.41 | 0.89 |
| Si (g/L) | 0.30 | 0.90 |
| Ca (g/L) | 0.33 | 0.72 |
| Mg (g/L) | 0.26 | 0.55 |
| Al (g/L) | 0.13 | 0.46 |
| Cu (g/L) | 0.05 | 1.03 |
| K (mg/L) | 145 | 173 |
| Na (mg/L) | 94 | 114 |
| As (mg/L) | 52 | 190 |
| Zn (mg/L) | 38 | 102 |
| Cd (mg/L) | 39 | 57 |
| Pb (mg/L) | <5 | 99 |
| Co (mg/L) | 14 | 43 |
| P (mg/L) | 23 | 25 |
| TOR (kg $O_2/m^3$)* | 1.0 | 3.7 |

*Oxygen requirement for arsenic, iron and sulfur oxidation.

Sending the acid feed of Table 2 through the test circuit described by FIG. 1 and Table 1 readily neutralized the solution to a pH of at least 9.0 to 9.5 with a slaked lime base. This process provided good pH control and produced a stable precipitate.

Samples having an iron to arsenic molar ratio of at least 5 formed by neutralization after oxidation provided very stable compounds. In fact, digesting 5 g of dried solids (0.2 to 0.6 weight percent arsenic), at room temperature, in 100 mL of acetic acid/sodium acetate buffer solution, at pH 5, per Ontario Reg. No. 309 (309), for 18 hours dissolved less than 0.01 mg/L of arsenic. Even after 18 hours of further digestion, by maintaining pH at approximately 5 with acetic acid, leached less than 0.01 mg/L of arsenic.

Combining the oxidizing and neutralizing steps for comparative purposes precipitates a less stable compound. Samples tested in these processes dissolved up to 0.20 mg/L of arsenic with the Regulation 309 test.

Figure 2:
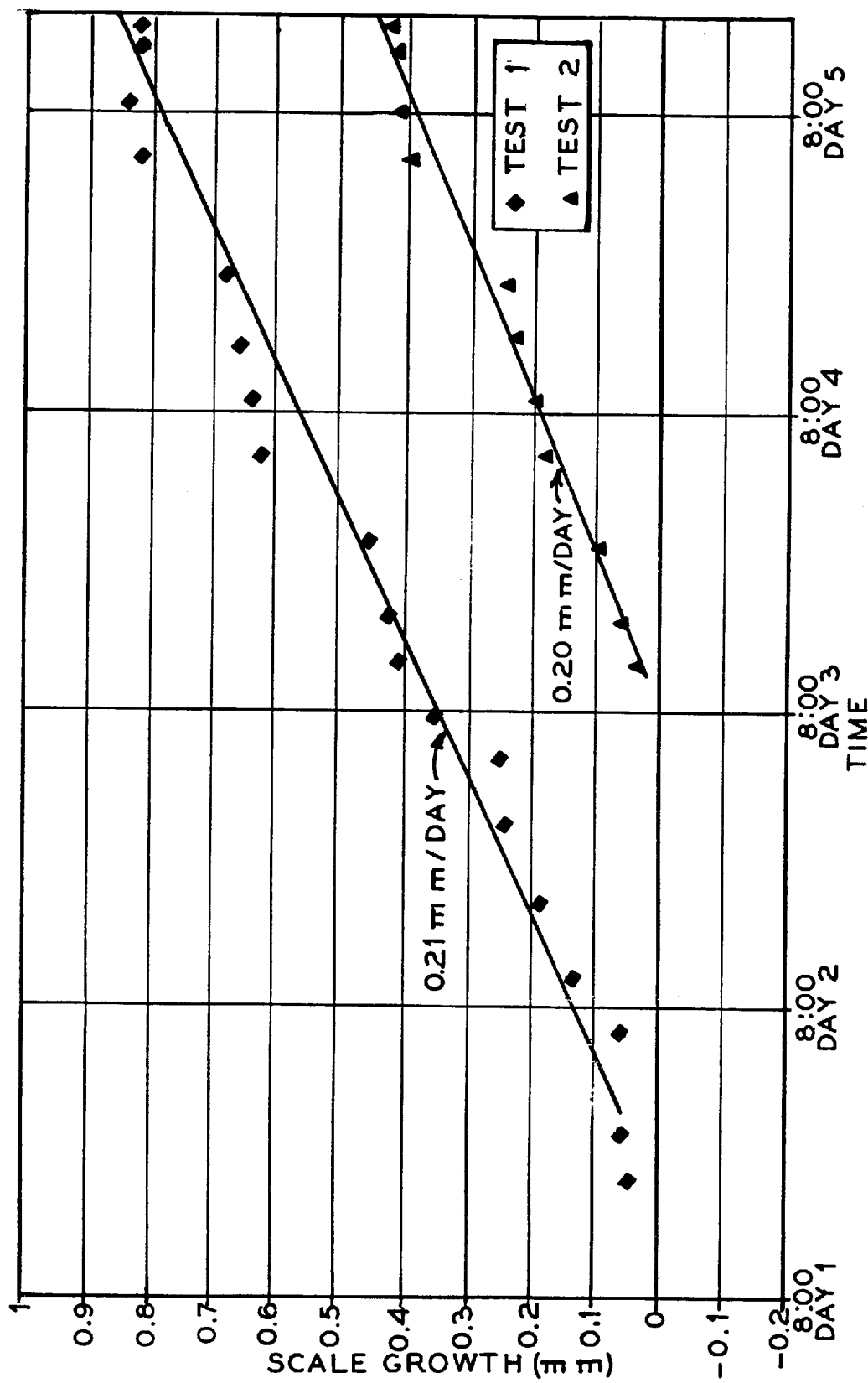
FIG. 2 is a plot of scale growth versus time for the acid stream process that lacks an independent conditioning tank.
Figure 3:
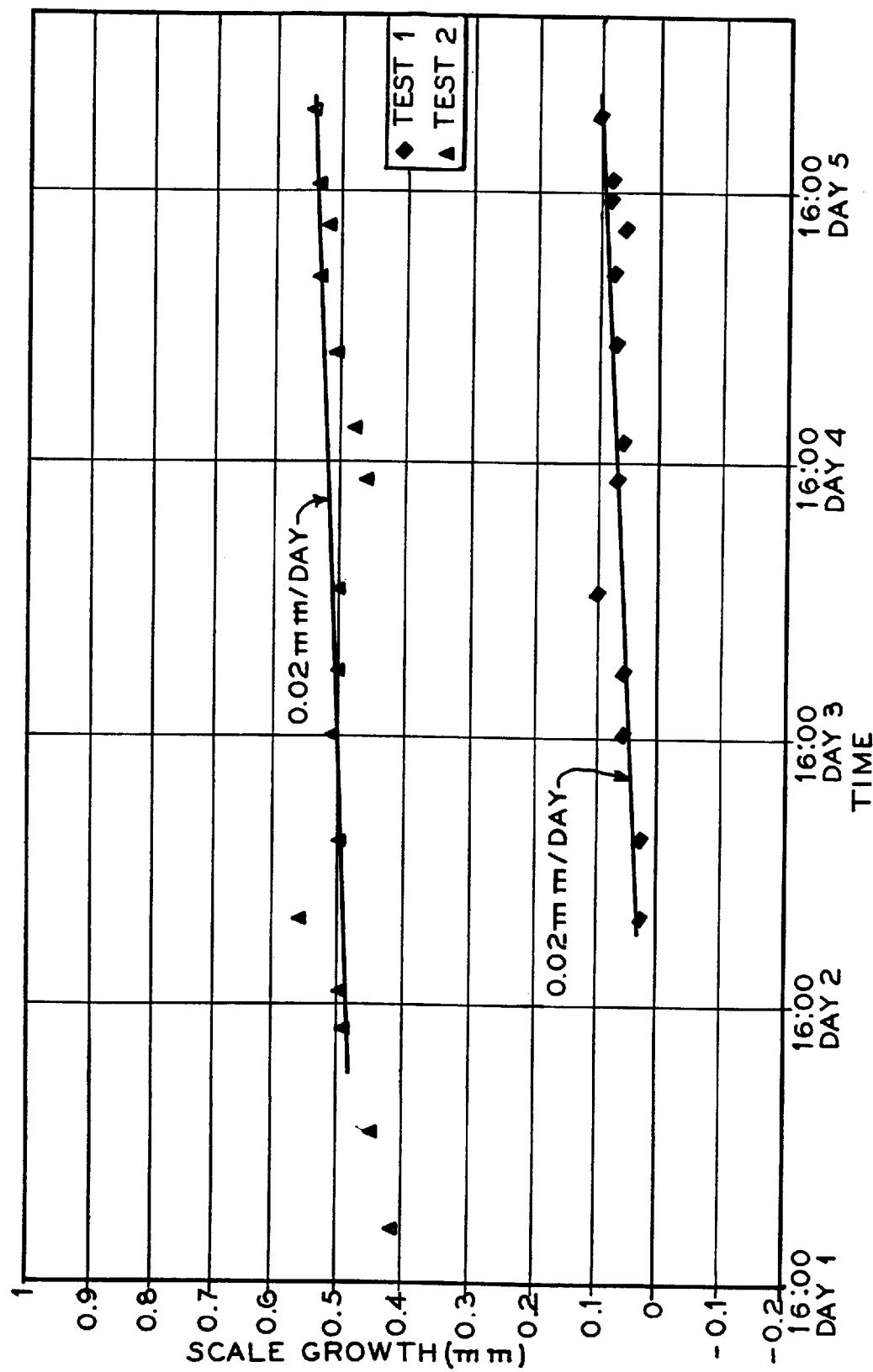
FIG. 3 is a plot of scale growth versus time for the acid stream process that uses an independent conditioning tank (FIG. 1, item 32).

For purposes of comparison, FIG. 2 shows the scale growth rate of about 0.2 mm/day that resulted from pre-mixing recycled sludge with lime. FIG. 3 shows a scale growth rate of only 0.02 mm/day when using a separate seed conditioning step. Thus, an independent scale conditioning vessel decreased the scale growth rate by a factor of about 10 in comparison to the pre-mixed sludge method.

The process provides a low scaling rate method of neutralizing solutions from wet scrubbing of smelter flue gas with low-cost calcium-containing bases. Furthermore, the method removes arsenic from difficult to treat sulfur dioxide-containing solutions. In addition, the process produces a neutralized precipitate that contains a stable ferric arsenate compounds.

In accordance with the provisions of the statute, this specification illustrates and describes specific embodiments of the invention. Those skilled in the art will understand that the claims cover changes in the form of the invention. For example, addition of iron when iron to arsenic in the feed is lower than the target, and addition of sulfur dioxide when sulfur dioxide in the feed is too low. Furthermore certain features of the invention may operate advantageously without a corresponding use of the other features.

We claim:

1. A method of removing arsenic from solutions containing sulfur dioxide comprising the steps of:
   introducing an aqueous solution into an oxidation reactor, said aqueous solution containing iron, arsenic and sulfur dioxide;
   oxidizing iron, arsenic and sulfur dioxide contained in said aqueous solution;
   seeding said aqueous solution containing oxidized iron, arsenic and sulfur dioxide with a neutralized precipitate;
   neutralizing said seeded aqueous solution with a calcium-containing base to precipitate said neutralized precipitate, said neutralized precipitate including ferric arsenate compounds; and
   recycling a portion of said neutralized precipitate to said seeding step.

2. The method of claim 1 wherein said seeding occurs independent of said neutralizing step to condition said oxidized aqueous solution for said neutralizing step.

3. The method of claim 1 wherein said neutralizing precipitates said ferric arsenate compounds having a molar ratio of iron to arsenic of at least about 2.

4. The method of claim 1 wherein said neutralizing precipitates said neutralized precipitate with said seeded solution having a pH of at least about 7.

5. The method of claim 4 wherein lime neutralizes said seeded aqueous solution.

6. The method of claim 1 wherein said oxidizing step uses air to oxidize said arsenic, iron and sulfur dioxide.

7. A method of removing arsenic from solutions containing sulfur dioxide comprising the steps of:
   introducing an aqueous solution into an oxidation reactor, said aqueous solution containing iron, arsenic, and sulfur dioxide;
   oxidizing iron, arsenic and sulfur dioxide contained in said aqueous solution;
   seeding said aqueous solution containing oxidized iron, arsenic and sulfur dioxide with a neutralized precipitate;
   holding said seeded aqueous solution in a vessel to condition said seeded aqueous solution;
   neutralizing said conditioned aqueous solution with a calcium-containing base to precipitate said neutralized precipitate, said neutralized precipitate including ferric arsenate compounds; and
   recycling a portion of said neutralized precipitate to said seeding step.

8. The method of claim 7 wherein said neutralizing precipitates said ferric arsenate compounds having a molar ratio of iron to arsenic of at least about 4.

9. The method of claim 7 wherein said neutralizing precipitates said neutralized precipitate with said seeded solution having a pH of at least about 9.

10. The method of claim 7 wherein lime neutralizes said seeded aqueous solution.

11. The method of claim 7 wherein said oxidizing step uses air to oxidize said arsenic, iron and sulfur dioxide.

* * * * *